No. 890,996. PATENTED JUNE 16, 1908.
B. J. MULLEN.
GAS WASHER.
APPLICATION FILED JULY 15, 1907.

WITNESSES:
A. Wagner.
L. B. Middleton.

INVENTOR
Benjamin J. Mullen.
By Herbert W. Jenner.
Attorney

UNITED STATES PATENT OFFICE.

BENJAMIN J. MULLEN, OF LEETONIA, OHIO.

GAS-WASHER.

No. 890,996.   Specification of Letters Patent.   Patented June 16, 1908.

Application filed July 15, 1907. Serial No. 383,744.

*To all whom it may concern:*

Be it known that I, BENJAMIN J. MULLEN, a citizen of the United States, residing at Leetonia, in the county of Columbiana and State of Ohio, have invented certain new and useful Improvements in Gas-Washers; and I do hereby declare the following to be a full, clear, and exact description of the invention, such as will enable others skilled in the art to which it appertains to make and use the same.

This invention relates to gas-washers for use in connection with blast-furnaces; and it consists in the novel construction and combination of the parts hereinafter fully described and claimed.

Figure 1:
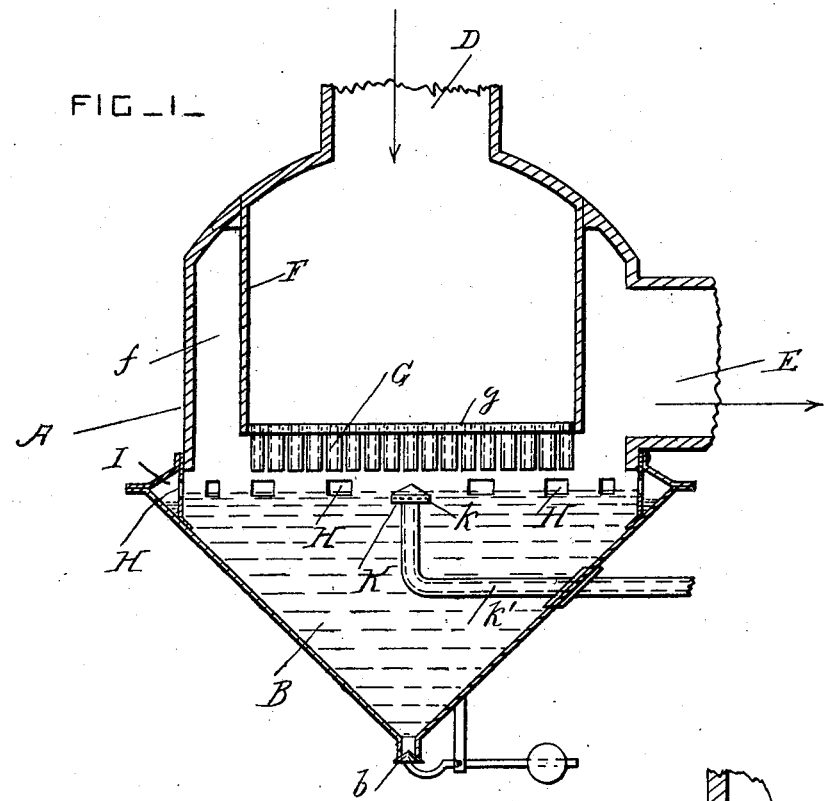
Figure 2:
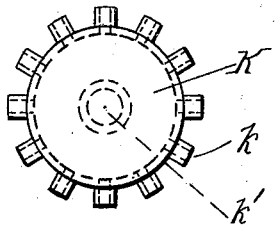
Figure 3:
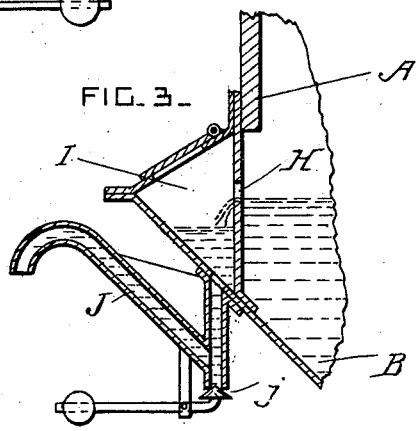

In the drawings, Figure 1 is a vertical section through the gas-washer. Fig. 2 is a plan view of the water distributer drawn to a larger scale. Fig. 3 is a vertical section through the annular water chamber also drawn to a larger scale.

A is the vessel in which the washing of the gas is effected. The lower part B of this vessel contains water, and $b$ is an outlet valve at the bottom of the vessel through which the water and dirt are removed periodically.

D is the inlet pipe for the gas, which is preferably connected to the top part of the vessel A and which conducts the gas into it from the blast furnace.

E is the outlet for the gas after being washed. This pipe E is preferably connected to the side of the vessel A, and it conducts the washed gas to the boilers or stoves in which it is used in the usual way.

F is a gas-chamber which depends from the upper part of the vessel A to a short distance above the water-level, and which forms an annular chamber $f$ for the washed gas. The lower part of the gas-chamber F is provided with a series of small pipes or gas-chambers G which depend from a head $g$. The pipes G divide up the gas into a series of jets and cause it to impinge upon the surface of the water in the gas-washer. The dirt falls to the bottom of the gas-washer and is removed periodically.

In order to prevent the very light and fine particles of dust from forming a scum upon the surface of the water and thereby preventing the gas from impinging against the water, the vessel A is provided with a series of outlet openings H at its periphery and at the normal water level. A single annular outlet opening might be provided, but it is preferable to use a series of outlet openings.

I is an annular water-chamber which encircles the main chamber A at its water level and which receives the water and dust which pass through the openings H.

J is an overflow pipe and water seal which is connected to the said annular water-chamber I, and which maintains the water level in the chamber I at a lower level than the water in the chamber A. This overflow pipe is provided with an outlet valve $j$ for emptying the chamber I periodically.

K is a water distributer arranged at about the center of the vessel A and at about the water level line. This water distributer is provided with a series of radial jets $k$, and $k'$ is the pipe which supplies water to the water distributer. The water which issues from the jets $k$, and the gas which issues from the pipes G, causes the water to flow radially at the water level, and carries the fine dust which settles on the water with it and discharges it through the openings H into the annular water chamber. In this manner the dust is prevented from forming a cake or crust upon the surface of the water, and the satisfactory washing of the gas is assured.

What I claim is:

1. In a gas washer, the combination, with a vessel for holding water provided with inlet and outlet openings for gas and having also an outlet for water, and means for dividing the entering gas into small volumes which impinge on the water; of a water supply pipe having its discharge end arranged within the said vessel in substantially the same horizontal plane as the said water outlet and at a point remote from it, whereby the floating dust is carried through the said water outlet.

2. In a gas washer, the combination, with a vessel for holding water provided with inlet and outlet openings for gas and having also a horizontally arranged series of outlets for water around it, and means for dividing the entering gas into small volumes which impinge on the water; of a water supply pipe having its discharge end arranged at the middle part of the said vessel and in substantially the same plane as the said water outlets, whereby the floating dust is carried through them.

3. In a gas-washer, the combination, with a vessel provided with inlet and outlet openings for gas, and having also a series of overflow-openings for water at its periphery, of means for dividing the gas into small volumes or jets which impinge on the surface of the water in the said vessel, a chamber for receiving the water and dust which flow through the said overflow-openings, and an inlet pipe for water provided with a distributer having radial nozzles and arranged at the center portion of the said vessel and causing the water in the said vessel to flow through the said overflow-openings.

4. In a gas-washer, the combination, with a vessel provided with inlet and outlet openings for gas, and having also a series of overflow openings for water at its periphery, of means for dividing the gas into small volumes or jets which impinge on the surface of the water in the said vessel, a chamber for receiving the water and dust which flow through the said overflow-openings, means for maintaining the water in the said chamber at a level lower than that of the water in the said vessel, and a water supply pipe connected to the said vessel.

5. In a gas washer, the combination, with a washing vessel provided with a water overflow-opening and a water supply-pipe, and having also a gas-inlet and gas-outlet arranged above the surface of the water in the said vessel; of a closed chamber for receiving the scum and water discharged through the said overflow-opening, and a pipe and water-seal connected to the lower part of the said closed chamber to drain off the surplus water automatically without letting out the scum and gas.

In testimony whereof I have affixed my signature in the presence of two witnesses.

BENJAMIN J. MULLEN.

Witnesses.
 NORA M. READY,
 GEORGE H. IRWIN.